US012424201B2

(12) United States Patent
Seo et al.

(10) Patent No.: US 12,424,201 B2
(45) Date of Patent: Sep. 23, 2025

(54) PRE-TRAINING A MODEL USING UNLABELED VIDEOS

(71) Applicant: Google LLC, Mountain View, CA (US)

(72) Inventors: Hongsuck Seo, Meylan (FR); Arsha Nagrani, Cambridge, MA (US); Anurag Arnab, Grenoble (FR); Cordelia Luise Schmid, Saint-Ismier (FR)

(73) Assignee: GOOGLE LLC, Mountain View, CA (US)

( * ) Notice: Subject to any disclaimer, the term of this patent is extended or adjusted under 35 U.S.C. 154(b) by 354 days.

(21) Appl. No.: 17/957,291

(22) Filed: Sep. 30, 2022

(65) Prior Publication Data
US 2024/0127794 A1    Apr. 18, 2024

(51) Int. Cl.
*G10L 15/06*    (2013.01)
*G10L 15/24*    (2013.01)
*G10L 15/26*    (2006.01)

(52) U.S. Cl.
CPC .......... *G10L 15/063* (2013.01); *G10L 15/24* (2013.01); *G10L 15/26* (2013.01)

(58) Field of Classification Search
CPC ....... G10L 15/063; G10L 15/24; G10L 15/26; G06F 16/71
See application file for complete search history.

(56) References Cited

U.S. PATENT DOCUMENTS

2021/0103775 A1*    4/2021    Glass ............... G06F 40/284

OTHER PUBLICATIONS

Seo, Paul Hongsuck, Arsha Nagrani, and Cordelia Schmid. "Look before you speak: Visually contextualized utterances." Proceedings of the IEEE/CVF Conference on Computer Vision and Pattern Recognition. 2021. (Year: 2021).*
Sun, Chen, et al. "Videobert: A joint model for video and language representation learning." Proceedings of the IEEE/CVF international conference on computer vision. 2019. (Year: 2019).*
Seo, Paul Hongsuck, Arsha Nagrani, Anurag Arnab, and Cordelia Schmid. "End-to-end generative pretraining for multimodal video captioning." In Proceedings of the IEEE/CVF Conference on Computer Vision and Pattern Recognition, pp. 17959-17968. 2022. Conference: Jun. 18-24, 2022. (Year: 2022).*

* cited by examiner

*Primary Examiner* — Sonia L Gay
(74) *Attorney, Agent, or Firm* — DORITY & MANNING P.A.

(57) ABSTRACT

Systems and methods method for performing captioning for image or video data are described herein. The method can include receiving unlabeled multimedia data, and outputting, from a machine learning model, one or more captions for the multimedia data. Training the machine learning model to create these outputs can include inputting a subset of video frames and a first utterance into the machine learning model, using the machine learning model to predict a predicted utterance based on the subset of video frames and the first utterance, and updating one or more parameters of the machine learning model based on a loss function that compares the predicted utterance with the second utterance.

20 Claims, 7 Drawing Sheets

QUALITATIVE EXAMPLE ON YOUCOOK2 (FIRST ROW) AND MSR-VTT (LAST TWO ROWS) INCLUDING A FAILURE CASE (LAST ROW). GT: GROUND-TRUTH CAPTION. NO-PT: NO MULTIMODAL PRETRAINING. MV-GPT: OUTPUT OF PRETRAINED MODEL.

PRE-TRAINING A MODEL USING UNLABELED VIDEOS

FIELD

The present disclosure relates generally to machine learning. More particularly, the present disclosure relates to using unlabeled video data to pre-train a model for video understanding. The pre-trained model can then be fine-tuned to perform any number of tasks that require video understanding, including, as one example, a video captioning task.

BACKGROUND

A long-standing goal of the AI community is the development of conversational multimodal systems that can both reliably perceive the world and effortlessly communicate with humans. An emerging benchmark of progress in this field is the task of multimodal video captioning which tests both abilities; a successful model should not only accurately understand "multimodal" streams of input video (including the speech and the video frames), but also generate coherent natural language descriptions of the content.

A major challenge in the field of vision and language learning is the lack of large-scale, manually annotated data. Annotating captions for videos is time intensive, expensive and subjective (with low inter-annotator agreement)—this is in contrast to fields such as image classification where fully annotated datasets are orders of magnitude larger.

SUMMARY

Aspects and advantages of embodiments of the present disclosure will be set forth in part in the following description, or can be learned from the description, or can be learned through practice of the embodiments.

One example aspect of the present disclosure is directed to a method for training a machine learning model. The method can include receiving unlabeled multimedia data, the multimedia data including a plurality of video frames and a plurality of transcribed utterances and extracting one or more clips of multimedia data, the one or more clips including a subset of video frames of the plurality of video frames and at least a first utterance and a second utterance of the plurality of transcribed utterances associated with the subset of video frames, wherein the first utterance and second utterance occur at different times within the subset of video frames. The method can also include training the machine learning model using the one or more clips of multimedia data. Training the machine learning model can include inputting the subset of video frames and the first utterance into the machine learning model, using the machine learning model to predict a predicted utterance based on the subset of video frames and the first utterance, and updating one or more parameters of the machine learning model based on a loss function that compares the predicted utterance with the second utterance.

Another example aspect of the present disclosure is directed to a system for training a machine learning model. The system can include one or more processors and a memory comprising the machine learning model and one or more instructions that, when executed by the one or more processors, cause the one or more processors to perform a process. The process can include receiving unlabeled multimedia data, the multimedia data including a plurality of video frames and a plurality of transcribed utterances, and extracting one or more clips of multimedia data, the one or more clips including a subset of video frames of the plurality of video frames and at least a first utterance and a second utterance of the plurality of transcribed utterances associated with the subset of video frames, wherein the first utterance and second utterance occur at different times within the subset of video frames. The process can further include training the machine learning model using the one or more clips of multimedia data. Training the machine learning model can include inputting the subset of video frames and the first utterance into the machine learning model, using the machine learning model to predict a predicted utterance based on the subset of video frames and the first utterance, and updating one or more parameters of the machine learning model based on a loss function that compares the predicted utterance with the second utterance.

Another example aspect of the present disclosure is directed to a method for performing captioning for image or video data. The method can include receiving unlabeled multimedia data, the multimedia data including a plurality of video frames and a plurality of transcribed utterances and outputting, from a machine learning model, one or more captions for the multimedia data based on the received multimedia data, wherein the machine learning model has been previously trained by performing one or more operations. The one or more operations can include receiving unlabeled multimedia data, the multimedia data including a plurality of video frames and a plurality of transcribed utterances and extracting one or more clips of multimedia data, the one or more clips including a subset of video frames of the plurality of video frames and at least a first utterance and a second utterance of the plurality of transcribed utterances associated with the subset of video frames, wherein the first utterance and second utterance occur at different times within the subset of video frames. The one or more operations can further include training the machine learning model using the one or more clips of multimedia data. Training the machine learning model can include inputting the subset of video frames and the first utterance into the machine learning model, using the machine learning model to predict a predicted utterance based on the subset of video frames and the first utterance, and updating one or more parameters of the machine learning model based on a loss function that compares the predicted utterance with the second utterance.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure provides systems and methods for using unlabeled video data to pre-train a model for video understanding. Some example embodiments can include a multimodal video generative network that includes a sentence decoder and is trained with a bidirectional objective. In some examples, given input frames and present utterances from a multimedia clip, a future utterance can be predicted. Additionally or alternatively, given input frames and future utterances from a multimedia clip, present utterances can be predicted. Classifications can be generated for each of the predictions and can then be provided as tokens to the decoder for sentence generation. The sentence decoder can then be used to generate captions. Thus, in some implementations, the model can encode multimodal videos (frames and textual inputs) and generate captions.

More particularly, a major challenge in the field of vision and language learning is the lack of large-scale, manually annotated data. Annotating captions for videos is time intensive, expensive and subjective (with low inter-annotator agreement)—this is in contrast to fields such as image classification where fully annotated datasets are orders of magnitude larger. To overcome this limitation, there has been a flurry of recent works that pretrain their video-language models on instructional videos; a domain where the speech is particularly well aligned to visual content. Recently introduced datasets such as Cooking312K and HowTo100M leverage such instructional videos with associated captions from ASR (automatic speech recognition) to learn joint video-and-text embeddings or to train multimodal video encoders.

However, the models in these works often do not contain a decoder, lacking the ability to generate sentences, and thus only the video encoder is transferred to the downstream tasks. For the case of video captioning, the decoder is often learned from scratch. One can still initialize the decoder using independently pretrained weights such as those from a GPT-2 model. However, according to an aspect of the present disclosure, performance can be significantly improved by optimizing the encoder and the decoder jointly.

In particular, using multimodal information as input can greatly improve the quality of the generated captions. However, learning such an encoder-decoder model jointly from unlabeled data is particularly challenging, as it requires two streams of textual data—naturally occurring transcribed speech accompanying the video for the encoder, and target sentences for the decoder—whereas unlabeled videos only come with a single stream of speech. Recent works have attempted to solve this problem with a denoising autoencoder—wherein the input speech to the model is artificially "noised", or random words are masked out. The decoder is then tasked with simply reconstructing either the masked phrases or the original unmasked text, where the supervisory signals are provided only from the masked words. In these existing frameworks, additional losses are often required to strengthen the pretraining supervision, such as multimodal input alignment and segment ordering.

In aspects of the present disclosure, a novel, stronger loss is proposed. Future utterances can be utilized as another source of textual data and a model can be trained to generate these entirely unseen sentences. To alleviate the problem that future utterances are not temporally aligned, backward generation can be used to generate aligned utterances given future utterances. Experimental results show that a model pretrained with this bidirectional generation objective effectively transfers to multimodal video captioning and outperforms other state-of-the-art models.

Example systems and methods of the present disclosure are designed to take advantage of unlabeled video data (e.g., instructional video data), which can include video frames and utterances often linked to the visual content. Some example implementations approach leverage two textual streams—an input to the encoder and a captioning target for the decoder. Because unlabeled videos do not have captioning targets, the described model is trained to generate a future utterance in the video given the current video context and current utterances (forward generation). This gives two sources of textual supervision: the current utterance allows for learning how to optimally fuse modalities in the video encoder, while the decoder is tasked with predicting a new utterance it has never seen before. However, the goal is video captioning, and not 'predicting the future'. To enable the model to generate text corresponding to the present video context, additional backward generation loss can be added in—where the model generates the current utterance given the current video frames and a future utterance (backward generation). This encourages generated sentences to be temporally aligned (and hence more tightly coupled) with the visual inputs from the video frames. Leveraging this novel pre-training loss enables the use of unlabeled data, thereby providing the technical benefit of enabling training to occur in the absence of labelled data. Therefore, the ability of computer system to perform video understanding task is improved by increased access to training data.

Once the model has been pre-trained, it can be fine-tuned to perform any number of tasks which rely upon multimodal video understanding. One example task is video captioning. However, the model can also be fine-tuned to perform other tasks such as video classification or others. Alternatively, embeddings retrieved from portions of the model can serve as a source of latent information about a video for other downstream tasks.

With reference now to the Figures, example embodiments of the present disclosure will be discussed in further detail.

Example Devices and Systems

Figure 1A:
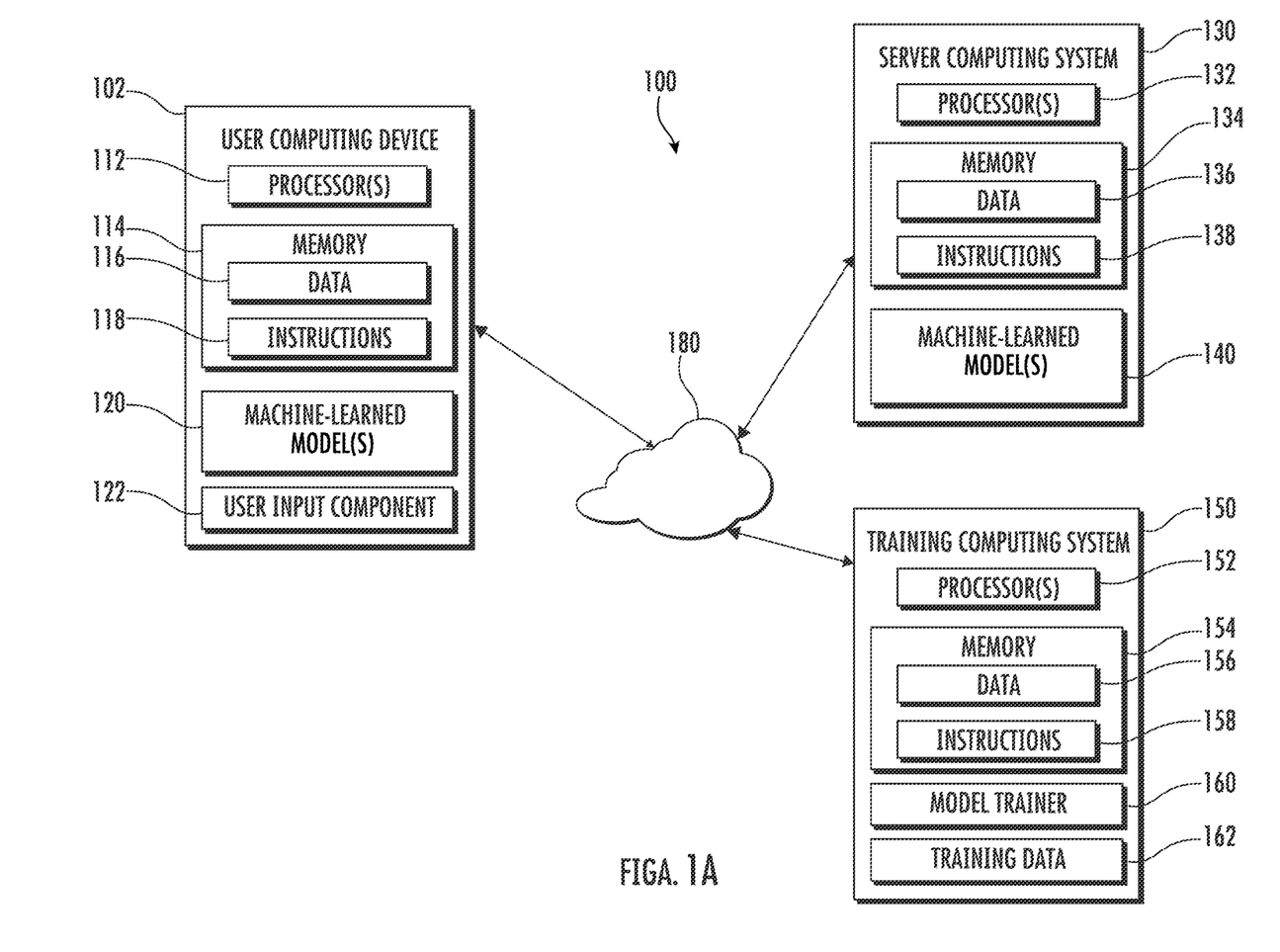
FIG. 1A depicts a block diagram of an example computing system that performs captioning for video data according to example embodiments of the present disclosure.

FIG. 1A depicts a block diagram of an example computing system 100 that performs video captioning according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more video captioning models 120. For example, the video captioning models 120 can be or can otherwise include various machine-learned models such as neural networks (e.g., deep neural networks) or other types of machine-learned models, including non-linear models and/or linear models. Neural networks can include feedforward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example video captioning models 120 are discussed with reference to FIG. 2.

In some implementations, the one or more video captioning models 120 can be received from the server computing system 130 over network 180, stored in the user computing device memory 114, and then used or otherwise implemented by the one or more processors 112. In some implementations, the user computing device 102 can implement multiple parallel instances of a single video captioning model 120 (e.g., to perform parallel video captioning across multiple instances of input video data).

More particularly, the one or more video captioning models can include a model that can effectively encode multimodal videos (visual frames and transcribed speech) as well as decode natural language sentences. This allows the use of the model for multimodal captioning. The model can be pretrained, and pretraining losses can be used to train an encoder and a decoder jointly from unlabeled video data. In some embodiments, the model can include modality specific encoders, a multimodal encoder, and a text decoder.

The model can be designed to take advantage of unlabeled instructional video data, which consists of video frames and utterances often linked to the visual content of the video frames. As mentioned earlier, the model can receive two textual streams—an input to the encoder and a captioning target for the decoder. Because unlabeled videos do not have captioning targets, the model can be trained to generate a future utterance in the video given the current video context and current utterances (forward generation). This gives the model two sources of textual supervision: the current utterance allows the model to learn how to optimally fuse modalities in the video encoder, while the decoder is tasked with predicting a new utterance it has never seen before. However, the output goal of the model is video captioning, and not 'predicting the future'. To enable the model to generate text corresponding to the present video context, the model can also include an additional backward generation loss—where the model generates the current utterance given the current video frames and a future utterance (backward generation). This encourages generated sentences to be temporally aligned (and hence more tightly coupled) with the visual inputs.

The use of both forward generation and backward generation can be described as bidirectional utterance generation. Given a large set of unlabeled videos, the model extract short clips consisting of visual frames $F=\{f_1, \ldots f_{N_f}\}$ and transcribed speech utterances $U=\{u_1, \ldots u_{N_u}\}$ aligned with F. For each clip, the model can also consider the immediate future utterance $W=\{w_1, \ldots w_{N_w}\}$ where $u_i$ and $w_j$ are tokenized words in the transcribed utterances. In some embodiments, the term 'utterance' can refer to a single sentence of transcribed speech.

In forward generation, the model is trained to generate a future utterance W given clip frames F and present utterances U. Formally speaking, forward generation's objective is to minimize the negative log-likelihood of the true future utterance W, where the loss function given by the chain rule is $\mathcal{L}_{FG}=-\Sigma_{i=1}^{N_w} \log P(w_i|w_1, \ldots, w_{i-1}, F, U)$. This loss encourages the pretrained model to effectively encode temporally aligned multimodal inputs to predict the future utterance.

In backward generation, the model can apply the same loss as described above, albeit in the backward direction. Namely, the model is tasked with generating present utterances U aligned with video frames F, conditioned on future utterances W and F. As in the forward generation, backward generation can also minimize the negative log-likelihood of the true present utterance $\mathcal{L}_{BG}=-\Sigma_{i=1}^{N_u} \log P(u_i|u_1, \ldots, u_{i-1}, F, W)$. In some embodiments, the visual input F is temporally aligned with the decoder output U. This loss function encourages the model to generate a caption related to the visual contents.

In some embodiments, the model can be trained using an additional supplementary loss associated with a masked language modeling (MLM) loss $\mathcal{L}_{MLM}(X)$, where X is the input utterance on which the masking is applied. The loss can be applied on both the forward and backward input utterances, as $\mathcal{L}_{MLM}(U)$ and $\mathcal{L}_{MLM}(W)$. In some embodiments, these losses are computed independently from the above bidirectional generation losses. Unlike UniVL, where the MLM loss is applied to the outputs of the encoder, the model can apply the MLM loss to the outputs of the decoder. This encourages the self-attention layers in the decoder to focus on further multimodal contextualization of the textual tokens (since each masked token prediction requires knowledge of neighboring context). This leads to performance gains for the model.

In some embodiments, the model can be comprised entirely of transformer blocks, and can be trained end-to-end directly from pixels and word tokens.

Given a multimodal video input consisting of the visual frames $F=\{f_1, \ldots, f_{N_f}\}$ and text inputs $X=\{x_1, \ldots, x_{N_x}\}$, features can be extracted from the individual modalities independently. In some embodiments, the textual input X is the aligned utterance U in general (for computing the forward generation loss and for downstream captioning tasks) but is set to W when computing the backward generation loss.

The model can include a textual encoder. The textual encoder can be used to extract $N_x$ contextualized textual embeddings $E=\{e_i\}$ from the input text using a BERT encoder.

The model can also include a visual decoder. Unlike previous approaches, where visual features are pre-extracted by models pretrained on different datasets, the model can extract the visual features directly from pixels. The model can use the recent transformer-based video encoder ViViT, in particular, the tubelet embedding scheme and the factorized encoder architecture. For the tubelet embedding scheme, the model first extracts spatio-temporal 3D tubes from the visual input volume resulting in S×T token embeddings where S and T correspond to the numbers of tokens in the spatial and temporal dimensions, respectively. Then, a spatial transformer first takes each group of S embeddings from the same temporal index with a special CLS token embedding, and a temporal transformer models interactions between the output CLS embeddings of the individual spatial groups with another CLS embedding resulting in T+1 visual features $V=\{v_j\}$.

Unlike 3D CNN visual encoders which operate on consecutive frames extracted at high frame rates (30 fps), the model's visual encoder can operate on coarsely sampled frames (1 fps), thus significantly reducing computing time. This allows the model to train the visual encoder end-to-end and helps adapt features across the domain gaps between pretraining and downstream datasets. It also allows the easy adoption of off-the-shelf video augmentation directly to RGB frames, which is useful for small-scale downstream benchmarks.

Once the two sets of textual features E and visual features V are extracted, a multimodal encoder fuses multimodal information using a co-attentional transformer. Each layer can include two streams, where each stream is a stack of two transformer blocks. In the textual stream, the features E are first contextualized using a cross-attention transformer block attending to the visual features V. Then, the output features are further contextualized by another transformer block with self-attention. The first transformer block performs intermodality contextualization through a cross-attention process whereas the second transformer block carries out intra-modality contextualization through a self-attention process. In the same way, the visual stream V attends to the textual stream. Them multimodal encoder repeats this process R times resulting in the output multimodal features $\hat{E}$ and $\hat{V}$.

Given multimodal video features $C=\hat{E}\cup\hat{V}$ as context, the model can autoregressively generate the output sentence Y conditioned on this context using a transformer decoder. To generate token $y_i$, the model can first encode the previous generated tokens $Y_i=\{y_0, \ldots, y_{i-1}\}$ with a look-up table and a positional embedding to produce $H_i=\{h_0, \ldots, h_{i-1}\}$. The model can then encode the context C and the previous embedded tokens $H_i$ using a single transformer. The outputs of this transformer are $\tilde{C}\cup\tilde{H}_i$, where $\tilde{H}_i=\{\tilde{h}_0, \ldots, \tilde{h}_{i-1}\}$. $\tilde{C}$ refers to the multimodal input embeddings obtained from the decoder and is used for computing the MLM loss. The model can then predict the next token $y_i$ from $\tilde{h}_{i-1}$ by a linear projection with a softmax: $y_i=\operatorname{argmax}(\operatorname{softmax}(\Phi\tilde{h}_{i-1}))$, where $\Phi\in\mathbb{R}^{v\times d}$ is the linear projection matrix and v is the vocabulary size. The first word $h_0$ is set using the special BOS (beginning of sentence) token, and tokens are generated until a special EOS (end of sentence) token is generated. In practice, each iteration requires only a single forward pass on the decoder transformer with the aid of causal masking as described above.

Since the pretraining objective for the model is bidirectional, each triplet (F, U, W) consisting of the visual frames F, the present utterances U and the future utterance W is processed by the model twice. For forward generation, the model takes F and U as inputs and generates W, and it generates U given F and W in backward generation. To enable the model to recognize the different configurations, distinct, special tokens CLS1 and CLS2 can be attached to the input text for the forward and backward generation losses respectively. Similarly, distinct BOS1 and BOS2 tokens can be provided to the decoder to initiate sentence generation.

In some embodiments, the model can be fine-tuned. In downstream video captioning datasets, video clips (consisting of frames F and aligned utterances U) are manually annotated with a natural language caption. During finetuning, the CLS1 token can be attached to U (as is done in forward generation), since U is an aligned utterance, but for generation the BOS2 token (as is done in backward generation to predict the present utterance) can be provided, so that a temporally aligned caption is generated.

For the text encoder, the model can use, for example, the BERT-Base architecture with uncased wordpiece tokenization. The visual encoder can use the corresponding ViViT-Base configuration with a 1-layer temporal transformer and a tubelet size of 16×16×4. The multimodal encoder can include 2 layers following and finally, the decoder can be based on the GPT-2 (117M parameters) architecture.

However, modifications can be made. For example, the decoder can be modified to take multimodal input context C and a BOS token allowing conditional generation, wherein the original GPT starts generation immediately by taking the first word as its input and only conditions on text. The model can also initialize the text encoder and the decoder with the standard BERT and GPT-2 weights respectively pretrained on large-scale unlabeled corpora. Similarly, the model can initialize the visual encoder using the pretrained weights on Kinetics 400. The model can be pretrained end-to-end using the Adam optimizer for 1.5M iterations with the batch size of 2048.

Additionally or alternatively, one or more video captioning models 140 can be included in or otherwise stored and implemented by the server computing system 130 that communicates with the user computing device 102 according to a client-server relationship. For example, the video captioning models 140 can be implemented by the server computing system 140 as a portion of a web service (e.g., a video captioning service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected.

The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more video captioning models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIG. 2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the OVERALL models 120 and/or 140 based on a set of training data 162. The training data 162 can include, for example, multimedia data that includes video frames and, in some embodiments, transcribed utterances associated with the video frames. For example, training data can be extracted from any set of videos and can include triplets of frames, current utterances, and future utterances. In some embodiments, the current utterances and the future utterances can be obtained from transcriptions of the videos.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
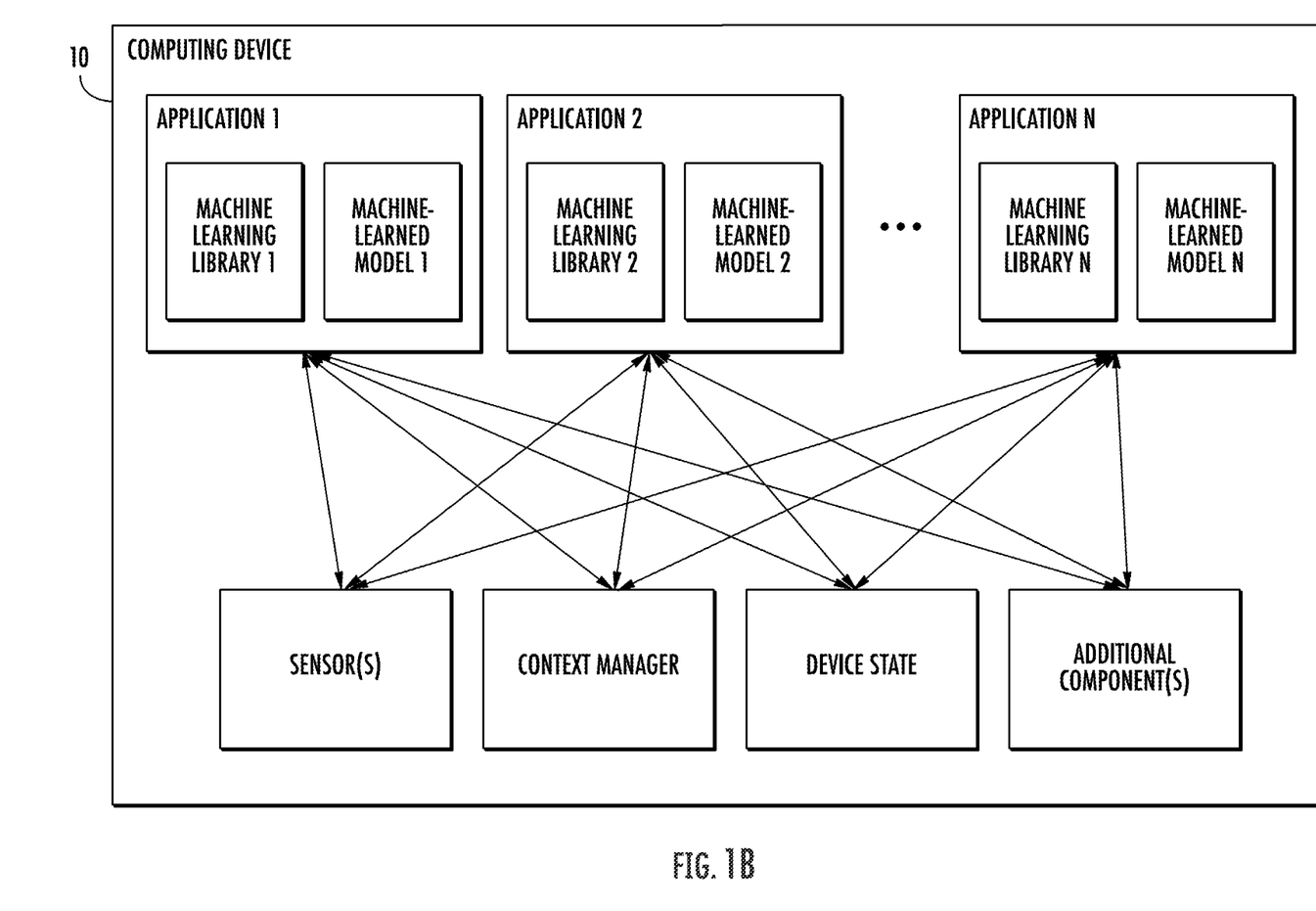
FIG. 1B depicts a block diagram of an example computing device that performs captioning for video data according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
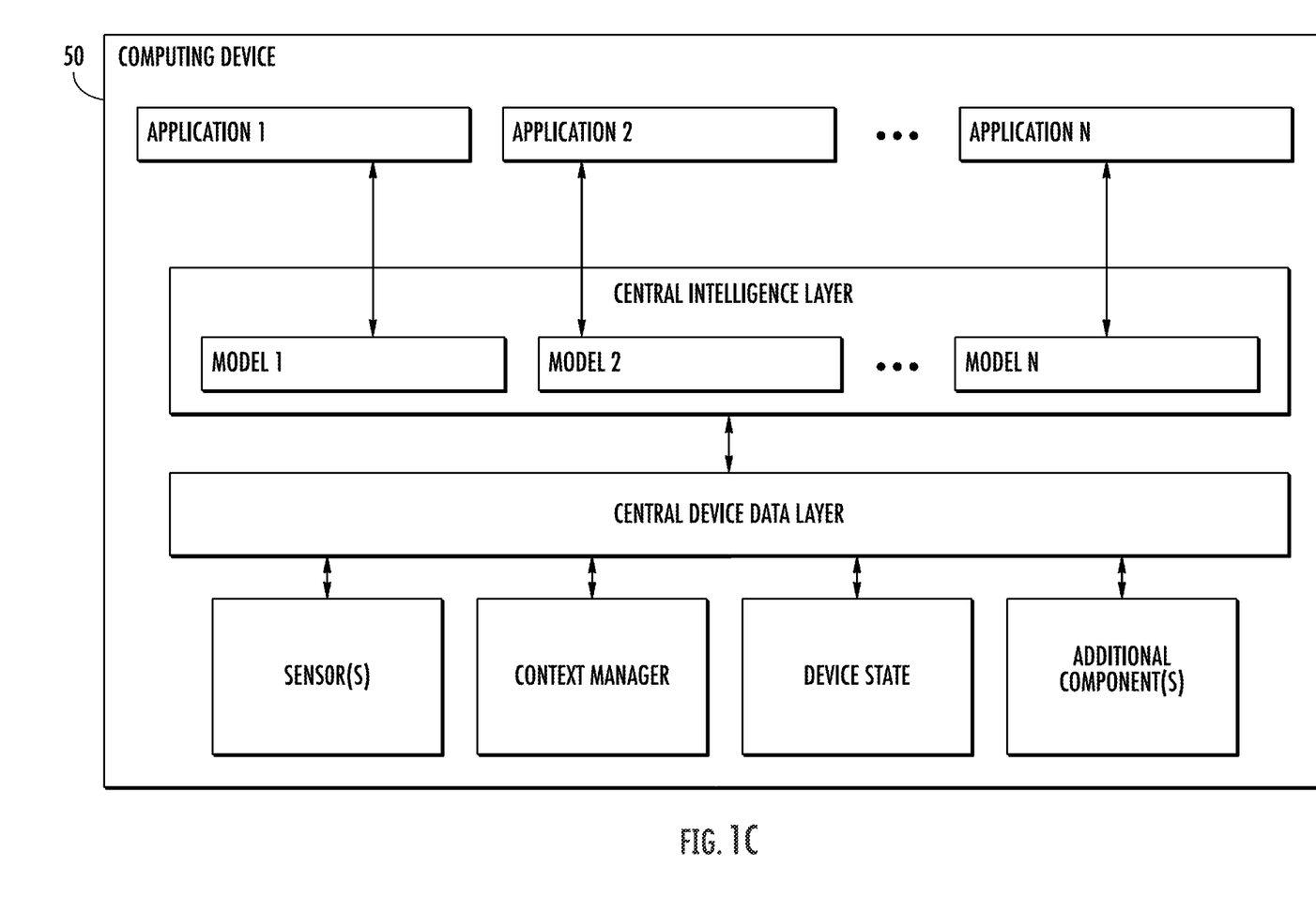
FIG. 1C depicts a block diagram of an example computing device that performs captioning for video data according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
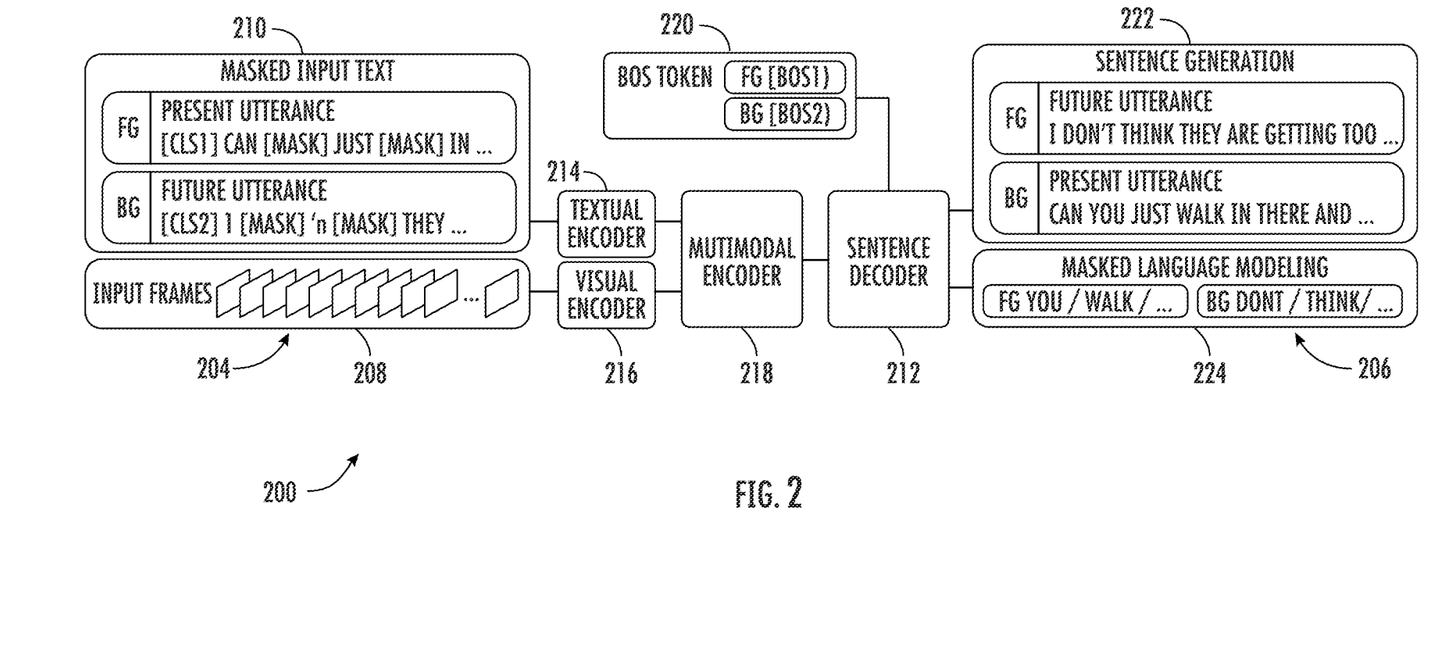
FIG. 2 depicts a block diagram of an example video captioning model according to example embodiments of the present disclosure.

FIG. 2 depicts a block diagram of an example video captioning model 200 according to example embodiments of the present disclosure. In some implementations, the video captioning model 200 is trained to receive a set of input data 204 descriptive of multimedia data and, as a result of receipt of the input data 204, provide output data 206 that includes caption(s) for a plurality of video frames. In particular, a plurality of input frames 208 without labeled captions and associated input transcriptions 210, including in some embodiments masked input text (e.g., transcriptions). As described above, the plurality of input frames 208 can be input into a visual encoder 212 and the input transcriptions 210 can be input into a textual encoder 214. The outputs of the visual encoder 212 and the textual encoder 214 can be fused at a multimodal encoder 216 and sent from the multimodal encoder 216 to a sentence decoder 218. In some embodiments, the sentence decoder 218 can also receive tokenized words 220 from utterances.

The output data 206 of the sentence decoder 218 can include fully generated sentences 222 and masked output language 224, which can in turn be associated with one or more frames of video as captions for the one or more frames of video.

Figure 3:
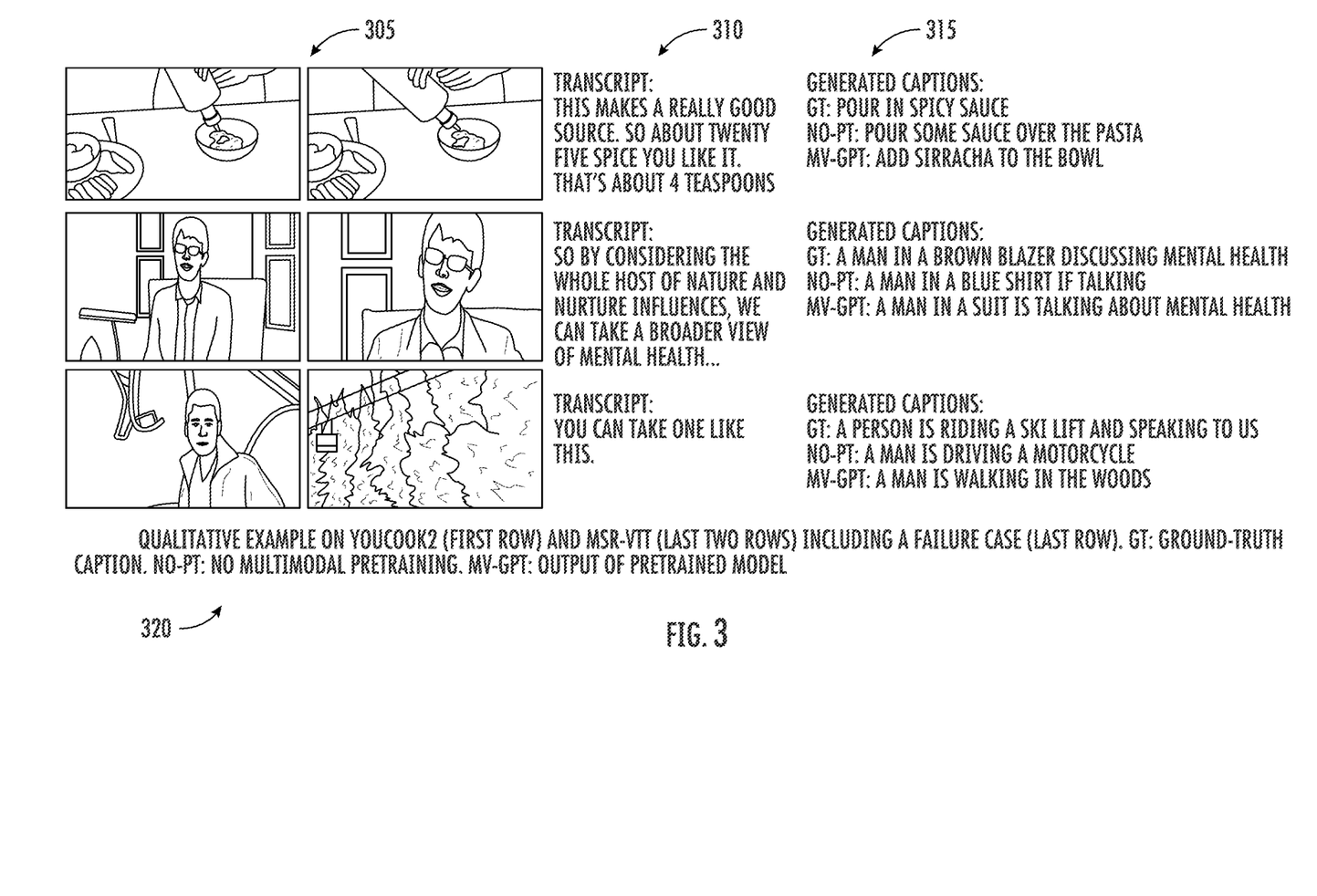
FIG. 3 depicts a plurality of video frames with associated transcripts and an output of a video captioning model according to example embodiments of the present disclosure.

FIG. 3 depicts a plurality of video frames 305 with associated transcripts 310 and an output 315 of a video captioning model according to example embodiments of the present disclosure. As shown, different sets of the plurality of video frames 305 can be provided along with the associated transcripts 310 of the plurality of video frames 305. Various models 320 can take these inputs and the resulting outputs are illustrated as the output 315 showing generated captions from the ground truth transcript, a model without multimodal pretraining, and a pretrained model as described above.

Example Methods

Figure 4:
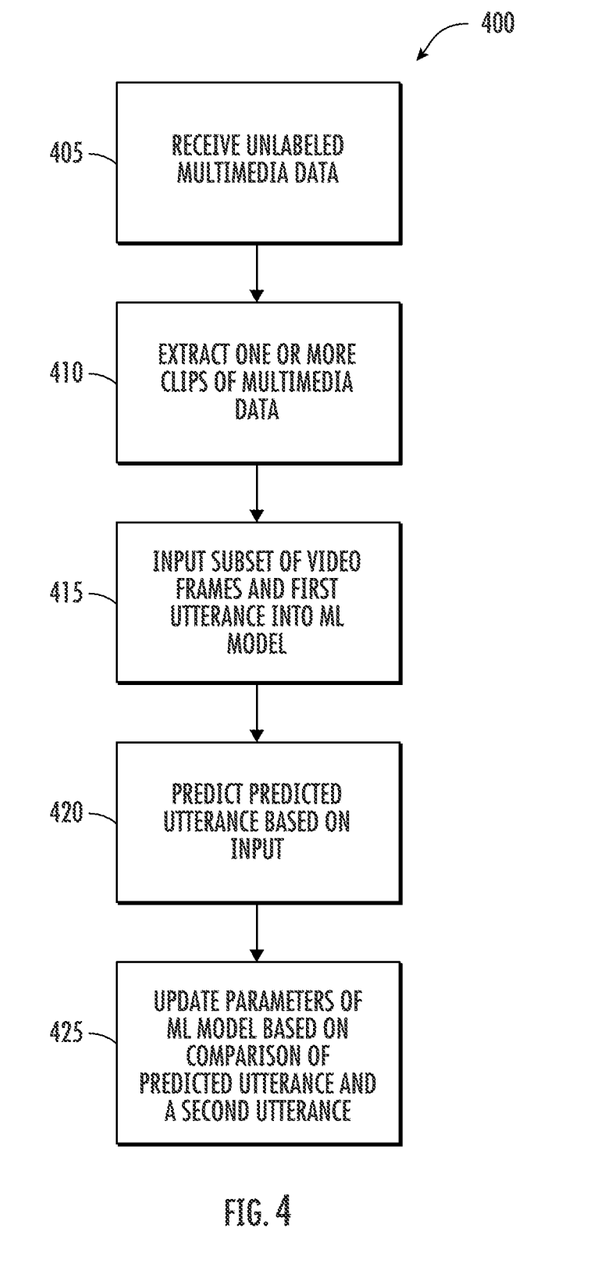
FIG. 4 depicts a flow chart diagram of an example method to perform model training according to example embodiments of the present disclosure.

FIG. 4 depicts a flow chart diagram of an example method 400 to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At block 405, a computing system executing method 400 can receive unlabeled multimedia data. In some embodiments, the multimedia data can include a plurality of video frames and a plurality of transcribed utterances associated with the plurality of video frames.

At block 410, the computing system executing method 400 can extract one or more clips of multimedia data. The one or more clips can include a subset of video frames of the plurality of video frames and at least a first utterance and a second utterance of the plurality of transcribed utterances associated with the subset of video frames, wherein the first utterance and second utterance occur at different times within the subset of video frames. In some embodiments, the first utterance is temporally before the second utterance. In other embodiments, the second utterance is temporally before the first utterance. In some embodiments, the first utterance and the second utterance are textual transcriptions of a spoken sentence in the subset of video frames.

At block 415, the computing system executing method 400 can input the extracted clips into a machine learning model, such as the machine learning models described above with regards to FIGS. 1A and 2. The extracted clips can then be used to train the machine learning model as described above.

At block 420, the computing system executing method 400 can predict a predicted utterance based on the input extracted clips. For example, the machine learning model can perform forward generation with a first utterance and a second utterance, where the second utterance is temporally subsequent to the first utterance. The goal of performing forward generation is to minimize a negative log-likelihood of the temporally subsequent second utterance (the utterance being predicted) based on the subset of video frames and the first utterance. This negative log-likelihood loss can then be used to train the machine learning model.

In another example, the machine learning model can perform back generation with a first utterance and a second utterance, where the second utterance is temporally prior to the first utterance. The goal of performing backward generation is to minimize a negative log-likelihood of the temporally prior second utterance (the utterance being predicted) based on the subset of video frames and the first utterance. This negative log-likelihood loss can then be used to train the machine learning model.

In some embodiments, predicting the predicted utterance can include masking at least a portion of the first utterance and performing masked language modeling loss on the first utterance to obtain a masked loss. This masked language modeling loss can then be used to train the machine learning model. In some embodiments, this loss can be applied to both forward and backward generation training of the machine learning model. In some embodiments, the masked language modeling loss can be applied to outputs of a decoder of the machine learning model.

At block 425, the computing system executing method 400 can update parameters of the machine learning model based on a comparison of the predicted utterance and the second utterance. For example, based on calculated losses from forward generation, backward generation, and/or masked language modeling loss, parameters of the machine learning model can be updated to minimize the overall loss of the machine learning model. After the machine learning model is trained by one or more training sets of training data, the machine learning model can be used receive unlabeled multimedia data and output one or more captions for video frames of the unlabeled multimedia data.

Figure 5:
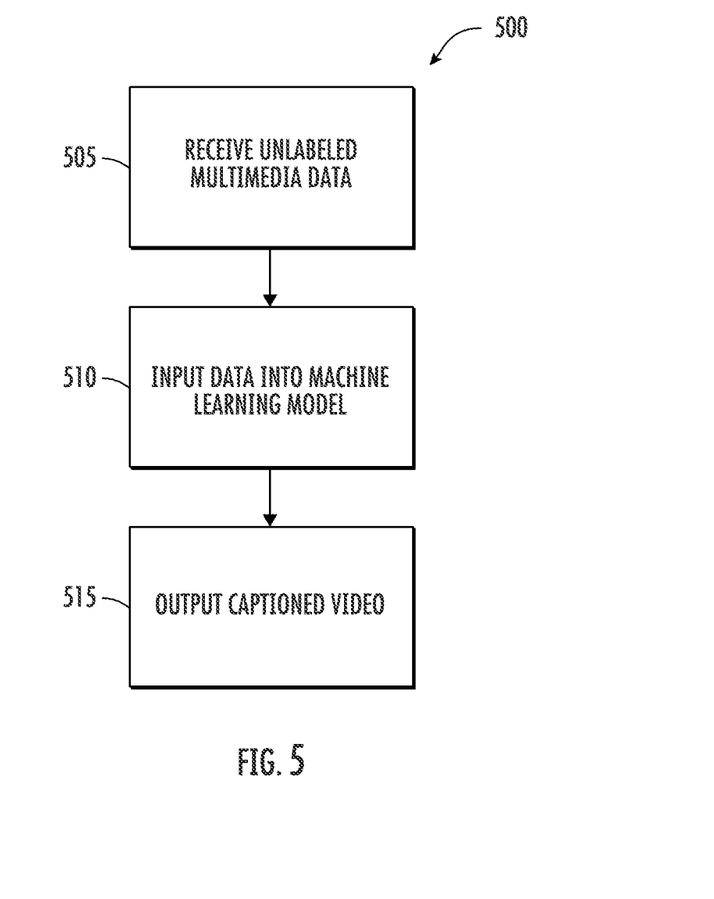
FIG. 5 depicts a flow chart diagram of an example method to perform video captioning according to example embodiments of the present disclosure.

FIG. 5 depicts a flow chart diagram of an example method 500 to perform video captioning according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At block 505, a computing system executing method 500 can receive unlabeled multimedia data. In some embodiments, the multimedia data can include a plurality of video frames and a plurality of transcribed utterances.

At block 510, the computing system executing method 500 can input the received unlabeled multimedia data into a machine learned model such as the models described above with regards FIGS. 1A, 2, and 4. The machine learned model, in some embodiments, has been trained to receive unlabeled multimedia data and output video captions for the multimedia data.

At block 515, the computing system executing method 500 can output one or more captions for one or more video frames based on the output of the machine learned model.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for training a machine learning model, the method comprising:
   receiving unlabeled multimedia data, the multimedia data including a plurality of video frames and a plurality of transcribed utterances;
   extracting one or more clips of multimedia data, the one or more clips including a subset of video frames of the plurality of video frames and at least a first utterance and a second utterance of the plurality of transcribed utterances associated with the subset of video frames, wherein the first utterance and second utterance occur at different times within the subset of video frames; and
   training the machine learning model using the one or more clips of multimedia data, wherein the machine learning model comprises an encoder model and a decoder model, wherein training the machine learning model comprises:
      inputting the subset of video frames and the first utterance into the machine learning model;
      using the decoder model to generate a predicted utterance based on the subset of video frames and the first utterance; and
      jointly updating one or more parameters of the encoder model and the decoder model based on a loss function that compares the predicted utterance with the second utterance.

2. The method of claim 1, wherein training the machine learning model comprises:
   performing forward generation on each of the one or more clips of multimedia data to train the machine-learning model, wherein, in said forward generation, the second utterance is temporally subsequent to the first utterance.

3. The method of claim 2, wherein performing forward generation further comprises minimizing the negative log-likelihood of the predicted utterance with respect to the second utterance.

4. The method of claim 1, wherein training the machine learning model comprises:
   performing backward generation on each of the one or more clips of multimedia data to train the machine-learning model, wherein, in said backward generation, the second utterance is temporally prior to the first utterance.

5. The method of claim 4, wherein backward generation further comprises minimizing the negative log-likelihood of the predicted utterance with respect to the second utterance.

6. The method of claim 1, wherein each of the first utterance and the second utterance is a textual transcription of a spoken sentence.

7. The method of claim 1, wherein training the machine learning model further comprises:
   masking at least a portion of the first utterance;
   performing masked language modeling loss on the first utterance to obtain a masked loss; and
   training the machine learning model using the masked loss.

8. The method of claim 7, wherein the masked loss is applied to outputs of the decoder model of the machine-learning model.

9. The method of claim 7, wherein the masked loss is applied to both forward generation and backward generation training of the machine learning model.

10. The method of claim 1, further comprising fine-tuning the machine learning model to receive unlabeled multimedia data and output one or more captions for video frames of the unlabeled multimedia data.

11. A system for training a machine learning model, the system comprising:
   one or more processors; and
   a memory comprising the machine learning model and one or more instructions that, when executed by the one or more processors, cause the one or more processors to perform a process, the process comprising:
      receiving unlabeled multimedia data, the multimedia data including a plurality of video frames and a plurality of transcribed utterances;
      extracting one or more clips of multimedia data, the one or more clips including a subset of video frames of the plurality of video frames and at least a first utterance and a second utterance of the plurality of transcribed utterances associated with the subset of video frames, wherein the first utterance and second utterance occur at different times within the subset of video frames; and
      training the machine learning model using the one or more clips of multimedia data, wherein the machine learning model comprises an encoder model and a decoder model, wherein training the machine learning model comprises:
         inputting the subset of video frames and the first utterance into the machine learning model;
         using the decoder model to generate a predicted utterance based on the subset of video frames and the first utterance; and
         jointly updating one or more parameters of the encoder model and the decoder model based on a loss function that compares the predicted utterance with the second utterance.

12. The system of claim 11, wherein training the machine learning model comprises:
performing forward generation on each of the one or more clips of multimedia data to train the machine-learning model, wherein, in said forward generation, the second utterance is temporally subsequent to the first utterance.

13. The system of claim 12, wherein performing forward generation further comprises minimizing the negative log-likelihood of the predicted utterance with respect to the second utterance.

14. The system of claim 11, wherein training the machine learning model comprises:
performing backward generation on each of the one or more clips of multimedia data to train the machine-learning model, wherein, in said backward generation, the second utterance is temporally prior to the first utterance.

15. The system of claim 14, wherein backward generation further comprises minimizing the negative log-likelihood of the predicted utterance with respect to the second utterance.

16. The system of claim 11, wherein training the machine learning model further comprises:
masking at least a portion of the first utterance;
performing masked language modeling loss on the first utterance to obtain a masked loss; and
training the machine learning model using the masked loss.

17. The system of claim 16, wherein the masked loss is applied to outputs of the decoder model of the machine-learning model.

18. The system of claim 16, wherein the masked loss is applied to both forward generation and backward generation training of the machine learning model.

19. The system of claim 11, further comprising fine-tuning the machine learning model to receive unlabeled multimedia data and output one or more captions for video frames of the unlabeled multimedia data.

20. A method for performing captioning for image or video data, the method comprising:
receiving unlabeled multimedia data, the multimedia data including a plurality of video frames and a plurality of transcribed utterances; and
outputting, from a machine learning model, one or more captions for the multimedia data based on the received multimedia data, wherein the machine learning model has been previously trained by performing one or more operations, the one or more operations comprising:
receiving unlabeled multimedia data, the multimedia data including a plurality of video frames and a plurality of transcribed utterances;
extracting one or more clips of multimedia data, the one or more clips including a subset of video frames of the plurality of video frames and at least a first utterance and a second utterance of the plurality of transcribed utterances associated with the subset of video frames, wherein the first utterance and second utterance occur at different times within the subset of video frames; and
training the machine learning model using the one or more clips of multimedia data, wherein the machine learning model comprises an encoder model and a decoder model, wherein training the machine learning model comprises:
inputting the subset of video frames and the first utterance into the machine learning model;
using the decoder model to generate a predicted utterance based on the subset of video frames and the first utterance; and
jointly updating one or more parameters of the encoder model and the decoder model based on a loss function that compares the predicted utterance with the second utterance.

* * * * *